(12) United States Patent
Auxer et al.

(10) Patent No.: US 7,472,169 B2
(45) Date of Patent: Dec. 30, 2008

(54) METHOD OF DISPLAYING TRAFFIC INFORMATION ON A WEB PAGE

(75) Inventors: Gregory A. Auxer, Glenmore, PA (US); Brian J. Smyth, West Chester, PA (US); David Harrod, Philadelphia, PA (US)

(73) Assignee: Traffic.com, Inc., Wayne, PA (US)

( * ) Notice: Subject to any disclaimer, the term of this patent is extended or adjusted under 35 U.S.C. 154(b) by 0 days.

(21) Appl. No.: 11/376,715

(22) Filed: Mar. 15, 2006

(65) Prior Publication Data

US 2007/0220110 A1    Sep. 20, 2007

(51) Int. Cl.
G06F 15/16       (2006.01)
G06F 17/00       (2006.01)

(52) U.S. Cl. .................. 709/217; 709/203; 715/205; 715/234; 715/749

(58) Field of Classification Search ............ 709/203, 709/217, 219; 701/117–119, 200, 206–209; 340/905; 715/201–204, 744, 760, 762, 205, 715/234, 749
See application file for complete search history.

(56) References Cited

U.S. PATENT DOCUMENTS

| | | | |
|---|---|---|---|
| 6,285,951 B1 | 9/2001 | Gaskins | |
| 6,297,748 B1 * | 10/2001 | Lappenbusch et al. | 340/905 |
| 6,317,686 B1 | 11/2001 | Ran | |
| 6,381,603 B1 | 4/2002 | Chan | |
| 6,438,490 B2 | 8/2002 | Ohta | |
| 6,466,862 B1 * | 10/2002 | DeKock et al. | 701/117 |
| 6,473,688 B2 * | 10/2002 | Kohno et al. | 701/117 |
| 6,552,682 B1 | 4/2003 | Fan | |
| 6,574,548 B2 | 6/2003 | DeKock | |
| 6,594,576 B2 | 7/2003 | Fan et al. | |
| 6,690,292 B1 * | 2/2004 | Meadows et al. | 340/905 |
| 6,701,248 B2 | 3/2004 | Petzold | |
| 6,748,426 B1 | 6/2004 | Shaffer | |
| 6,845,316 B2 * | 1/2005 | Yates | 701/117 |
| 6,871,137 B2 | 3/2005 | Scaer | |
| 6,968,271 B1 | 11/2005 | Wolfson | |
| 2002/0116494 A1 * | 8/2002 | Kocol | 709/224 |
| 2002/0128773 A1 | 9/2002 | Chowanic et al. | |
| 2003/0004743 A1 | 1/2003 | Callegari | |
| 2004/0143385 A1 | 7/2004 | Smyth | |
| 2004/0249568 A1 * | 12/2004 | Endo et al. | 701/209 |
| 2005/0027448 A1 | 2/2005 | Takenaga | |
| 2005/0288046 A1 | 12/2005 | Zhao | |
| 2006/0015397 A1 | 1/2006 | Vitrano | |
| 2006/0055565 A1 | 3/2006 | Kawamata | |
| 2007/0150168 A1 * | 6/2007 | Balcom et al. | 701/117 |
| 2007/0204219 A1 * | 8/2007 | Foulger et al. | 715/530 |

* cited by examiner

*Primary Examiner*—David Lazaro
(74) *Attorney, Agent, or Firm*—Panitch Schwarze Belisario & Nadel LLP

(57) ABSTRACT

A method of displaying traffic information on a web page is provided. The traffic information includes traffic conditions of one or more specified roads. A web browser requests a web page that includes programming code related to some traffic information. The web browser interprets the programming code and requests at least some of the traffic information from a remote site specified by the programming code. The request includes a uniform resource identifier (URI) of the remote site, and a unique identifier of the traffic information. The web browser then assembles the web page using at least some of the requested traffic information obtained from the remote site. The assembled web page displays at least some of the traffic information, including traffic conditions of the one or more specified roads.

31 Claims, 19 Drawing Sheets

Figure 1

Generic Examples:

- Any Road Closure ➔ 10
- Digital Commute
  - Average Speed (Based on 55 mph)
    - 45 mph ➔ 3
    - 30 mph ➔ 6
    - 20 mph ➔ 7.8
    - 15 mph ➔ 8.3
    - 10 mph ➔ 8.7
    - 7 mph ➔ 9.0
    - 5 mph ➔ 9.4
- Non-Digital Commute
  - Slow 30% ➔ 3.4
  - Slow 100% ➔ 7
  - Jammed 10% ➔ 5
  - Jammed 30% ➔ 7.5
  - Jammed 100% ➔ 8.6
  - Jammed 10%, Slow 30% ➔ 6.2
  - Route 202
    - Criticality 0 Item (No Congestion Item) ➔ 8
    - Criticality 1 Item (No Congestion Item) ➔ 7
    - Criticality 2 Item (No Congestion Item) ➔ 5
  - I-95
    - Criticality 0 Item (No Congestion Item) ➔ 3

Figure 2

| Test | Digital | Test Description | Jam Factor |
|---|---|---|---|
| Clear | D | 55 mph average speed | 0 |
|  | N | No Incidents | 0 |
| Closed | D | Incident w/ Road Closed Flag set | 10 |
|  | N | Incident w/ Road Closed Flag set | 10 |
| Light Traffic | D | 50 mph average speed | 1.2 |
|  | N | Congestion from 202 to Gladwyne (sluggish) | 1.2 |
| Construction | D | 45 mph average speed | 2.7 |
|  | N | Construction from 476 to Montgomery<br>Congestion from 202 to Montgomery (generally slow), linked to above construction | 3.5 |
| Rush Hour | D | 34 mph average speed | 5.5 |
|  | N | Congestion from Gulph to Gladwyne (generally jammed)<br>Congestion from Roosevelt to Spring Garden (slow) | 6.0 |
| Rush Hour Bad | D | 22 mph average speed | 7.5 |
|  | N | Congestion from 202 to Belmont (generally jammed)<br>Congestion from Girard to University (jammed) | 7.6 |
| Heavy Traffic | D | 8 mph average speed | 8.8 |
|  | N | Congestion from 202 to City Ave (jammed)<br>Congestion from Girard to University (stopped) | 8.9 |
| Incident 0 | N | Congestion from 202 to Montgomery (generally slow)<br>Criticality 0 accident (not linked with congestion) | 7.1 |
| Incident 1 | N | Congestion from 202 to Montgomery (generally slow)<br>Criticality 1 accident (not linked with congestion) | 5.8 |

Figure 4c

TrafficMagnet Registration - Microsoft Internet Explorer

File  Edit  View  Favorites  Tools  Help    Address  https://secure.traffic.com/servlet/Controller?appname=userregistration&workfl → Step 3 of 3: User Agreement and Privacy Policy (Required Field)

☐ "I have read and agree to the Terms of Use and Privacy Agreement below.

Terms of Use

```
Traffic Magnets Terms of Use

IMPORTANT - READ THESE TERMS AND CONDITIONS
CAREFULLY BEFORE DOWNLOADING, INSTALLING AND/OR
OTHERWISE USING THE SOFTWARE, DATA
AND/OR TECHNOLOGY KNOWN AS THE "TRAFFIC MAGNET."
TRAFFIC.COM, INC. ("TRAFFIC.COM") IS WILLING TO
LICENSE THE "MAGNET" TO YOU
```

Privacy Agreement

```
Traffic Magnets/Traffic.com®, Inc. Privacy
Statement

Traffic.com, Inc. and it affiliates
(collectively, "Traffic.com") respect the privacy
of the visitors to our web site at
www.traffic.com and affiliate websites and any co
branded, derivative or successor site
```

SUBMIT

METHOD OF DISPLAYING TRAFFIC INFORMATION ON A WEB PAGE

CROSS-REFERENCE TO RELATED APPLICATIONS

This patent application is related to concurrently filed U.S. application Ser. No. 11/376,731 filed Mar. 15, 2006, now U.S. Pat. No. 7,203,595, entitled "Rating that represents the status along a specified driving route".

BACKGROUND OF THE INVENTION

Currently, many company web sites (including, internet sites and intranet sites) contain some feature or method to display driving directions to the physical locations where the company is located. This allows a person who wants to drive to that location to easily find the directions by accessing the web site, without needing to consult external sources. The directions may be as simple as a written description of the roads and turns to take or may be as robust as a graphical map of several driving routes that could be taken to the location, along with generic estimated driving times. However, none of these options for driving directions give any information about the level of traffic currently on the roads that lead to the location. Estimated driving times are currently calculated simply based on maximum speed limits for the roads. What is needed is a way to display, on a web site, real-time information about the level of traffic on the roads that lead to a physical location. In this manner, a person who wants to drive to a location can simply bring up the web site for that location in a web browser and easily obtain not only driving directions, but whether they will encounter a significant level of traffic along the way.

Furthermore, a goal of many commercially-oriented web sites is to drive traffic (i.e., eyeballs) to the web site and to maintain the users on the web sites for as long as possible so as to increase advertising opportunities and promote branding. Web sites that provide useful and constantly changing information receive a tremendous number of hits each day. Weather, news and sports sites are examples of such high traffic sites. Since traffic information is also useful and constantly changing, a web site that includes current traffic information or a link to such traffic information is likely to experience an increase in the frequency of hits and the duration of the viewing period. Thus, it is desirable to provide a scheme to allow traffic information to be obtained on any web site.

BRIEF SUMMARY OF THE INVENTION

The present invention provides a method of displaying traffic information on a web page, wherein the traffic information includes traffic conditions of one or more specified roads. A web browser requests a web page that includes programming code related to some traffic information. The web browser interprets the programming code and requests at least some of the traffic information from a remote site specified by the programming code. The request includes a uniform resource identifier (URI) of the remote site, and a unique identifier of the traffic information. The web browser then assembles the web page using at least some of the requested traffic information obtained from the remote site. The assembled web page displays at least some of the traffic information, including traffic conditions of the one or more specified roads.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 shows generic examples of Jam Factors for various traffic situations.

FIG. 2 shows specific examples of Jam Factors for the commute segment I-76 from the PA Turnpike to the Walt Whitman Bridge.

FIG. 4c shows a screenshot of the Traffic Magnet registration page that displays the User Agreement and Privacy Policy.

DETAILED DESCRIPTION OF THE INVENTION

Figure 3A:
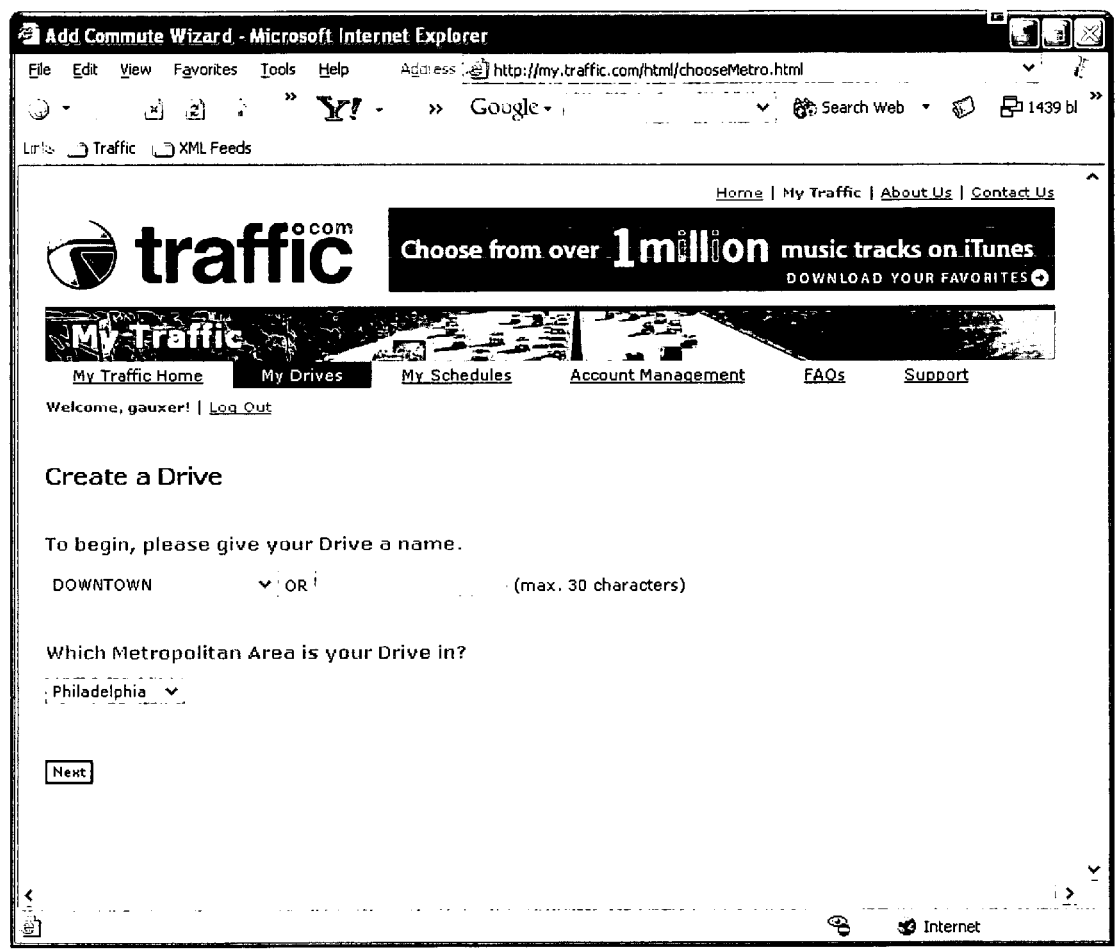
FIG. 3a shows the user interface display screen for selecting a drive name and metro (metropolitan) area.

Certain terminology is used herein for convenience only and is not to be taken as a limitation on the present invention. In the drawings, the same reference letters are employed for designating the same elements throughout the several figures.

The present invention is described in the context of two services, namely, TrafficMagnets™ and Jam Factor™ reports, both of which are commercially available from Traffic.com, Wayne, Pa. However, the scope of the present invention includes other embodiments that may differ from the specific implementations provided by the TrafficMagnets and Jam Factor reports. The present invention is also preferably designed to work in conjunction with systems and methods described in copending U.S. patent application Ser. No. 10/611,494 filed on Jun. 30, 2003, entitled "Method of Creating a Virtual Traffic Network," which is hereby incorporated by reference. However, the scope of the invention includes embodiments that do not necessarily incorporate the methods and apparatus described in this patent application.

I. Overview of Jam Factor Rating

The jam factor of a route is a value between 0 and 10 which indicates the ease of travel along the route. All clear would be a number towards 0, and completely jammed/stopped would be a number towards 10. Jam Factor calculations will be done primarily through delays (from free flow travel).

Determining delay for a digital route is done through sensor values. For a non-digital route, the delay is calculated through the incidents along the route. For routes which contain both digital and non-digital sections, separate calculations are done for each section and the final delays are added together.

Any road closure along the route will automatically create a Jam Factor of 10.

II. Calculations of Jam Factor Rating

1. Delay for Digital Routes:

The delay is calculated from the real-time sensor values. If there are any problems determining the delay from the sensors (sensors are no longer working, data is determined to be invalid), then the non-digital calculations are used for this route. Also, traffic items are still checked to determine if there is a road closure. Otherwise, traffic items are ignored for digital routes.

$$DigitalDelay = \frac{RouteLength}{SensorSpeed} - \frac{RouteLength}{SpeedLimit}$$

In the preferred embodiment of the present invention, the delay is never expressed as a negative number. Thus, if traffic is moving faster than the speed limit, the delay is reported as being zero.

2. Delay for Non-Digital Routes:

Delay for non-digital routes is calculated through the traffic items that occur along the route. There are two separate delays that are calculated, one for the congestion items and one for high criticality items which are not attributed (or linked) to a congestion item.

a. Congestion Delay:

Each congestion item will have a type associated with it which describes the level of congestion seen along the road. These congestion types will map to an estimated average speed, allowing a travel time to be calculated for the length of the congestion. Individual congestion delays will then be determined by calculating the difference between the free flow travel time and the congestion travel time. The total congestion delay will be the sum of all the individual congestion item delays.

$$CongestionTT = \frac{CongItemLength}{CongItemSpeed}$$

$$FreeFlowTT = \frac{CongItemLength}{RouteSpeedLimit}$$

$$CongestionDelay = \sum_{i=1}^{\#congitems} (CongestionTT_i - FreeFlowTT_i)$$

TABLE 1

| Congestion Speeds (based upon 60 mph roads): | |
|---|---|
| Congestion Type | Speed (mph) |
| Stopped | 2 |
| Jammed | 10 |
| Generally Jammed | 20 |
| Slow | 30 |
| Generally Slow | 40 |
| Sluggish | 48 |

Note: For roads with speed limits other than 60 mph, the congestion speeds will be adjusted according to the same percentages.

b. Incident Delay:

Incidents must be taken into account when there are no corresponding congestion items linked to them. A value will be looked up in a table that matches incident attributes with assumed delays. In one preferred embodiment, only the criticality of the incident is taken into account. All incidents that have a child congestion item will be ignored since they should already be accounted for by the congestion calculation above.

$$IncedentDelay = \sum_{i=1}^{\#items} (Delay_i)$$

The following table may be used to map the criticalities of incidents to an estimated delay.

TABLE 2

| Criticality Delays: | |
|---|---|
| Criticality | Delay (min) |
| 0 | 20 |
| 1 | 10 |
| 2 | 5 |
| 3 | 2 |

3. Jam Factor:

The Jam Factor is determined by first comparing the estimated travel time to the free flow travel time. This comparison is referred to as the Delay Multiple.

$$DelayMultiple = \frac{FreeFlowTT + TotalDelay}{FreeFlowTT}$$

where:

$$FreeFlowTT = \frac{KR\_Length}{speedLimit}$$

This Delay Multiple can be directly associated to the Jam Factor by an exponential equation where the Jam Factor equals 0 when the delay multiple equals 1 (no delay) and the Jam Factor approaches 10 as the delay multiple grows very large. A set of logical plot points along the curve was determined to create a graph of Jam Factor vs. Delay Multiple. Linear interpolation can then be used to determine the jam factor when the delay multiple lies between the plot points.

Below is a table of delay multiples with expected Jam Factors.

TABLE 3

JamFactor Points:

| Point # | Delay Multiple | Jam Factor | Speed Based on 60 mph limit |
|---|---|---|---|
| 1 | 1 | 0 | 60 |
| 2 | 1.25 | 3 | 48 |
| 3 | 1.5 | 5 | 40 |
| 4 | 1.75 | 6 | 34.2 |
| 5 | 2 | 7 | 30 |
| 6 | 3 | 8 | 20 |
| 7 | 8 | 9 | 7.5 |
| 8 | 32 | 10 | 2 |

To calculate the Jam Factor for a specific delay multiple, the following equation is sued (which utilizes the two points that the delay multiple falls between):

prev=point preceding the actual delay multiple
next=point following the actual delay multiple $$JamFactor = \frac{JamFactor_{next} - JamFactor_{prev}}{DelayMultiple_{next} - DelayMultiple_{prev}} *$$

$$(DelayMultiple_{actual} - DelayMultiple_{next}) + JamFactor_{ne.}$$

FIG. 1 shows generic examples of Jam Factors for various traffic situations.

FIG. 2 shows specific examples of Jam Factors for the commute segment I-76 from the PA Turnpike to the Walt Whitman Bridge.

III. Creating and Viewing a Jam Factor Rating

FIGS. 3a through 3g describe the process of creating a drive and viewing a Jam Factor for that drive. These figures are self-explanatory and thus will be described only briefly.

FIG. 3a shows the user interface display screen for selecting a drive name and metropolitan area.

Figure 3B:
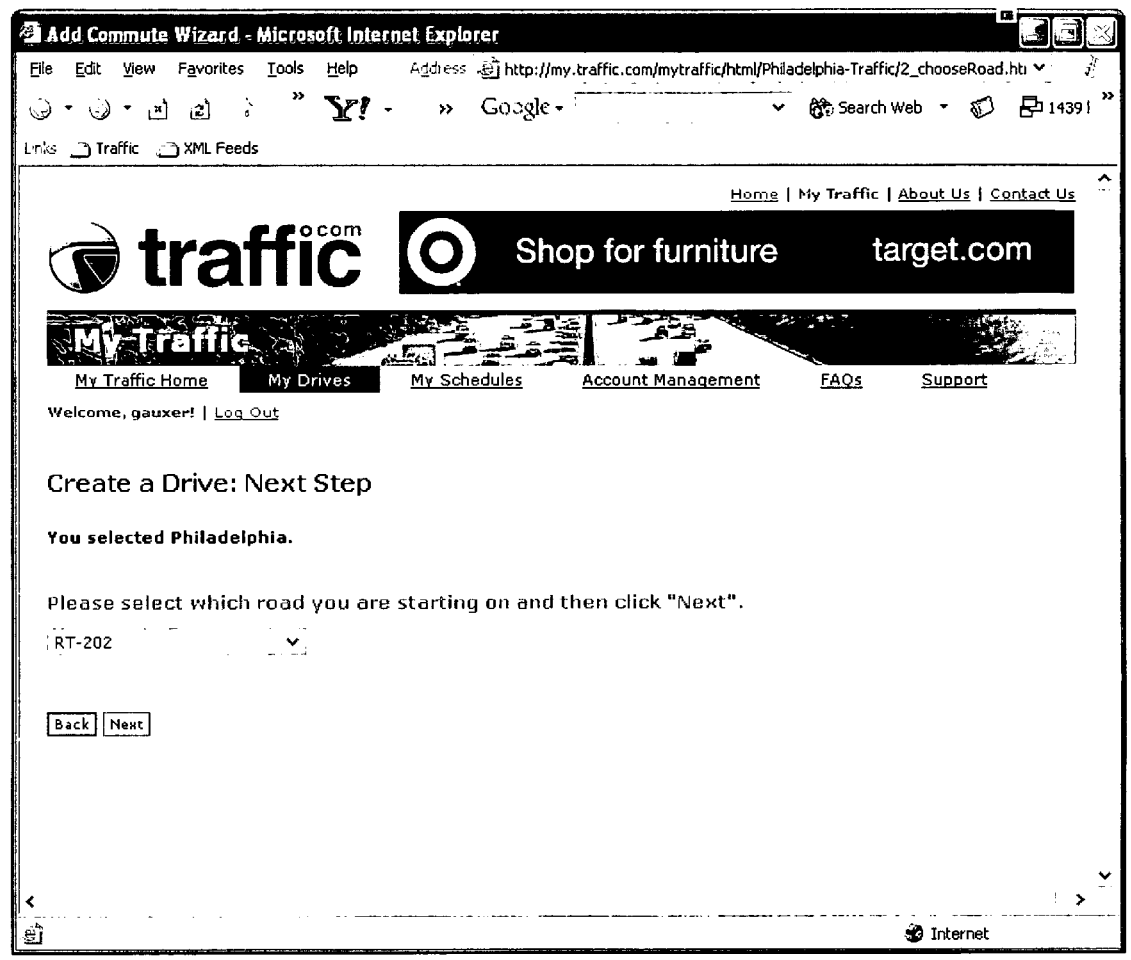
FIG. 3b shows the user interface display screen for selecting a starting roadway.

FIG. 3b shows the user interface display screen for selecting a starting roadway.

Figure 3C:
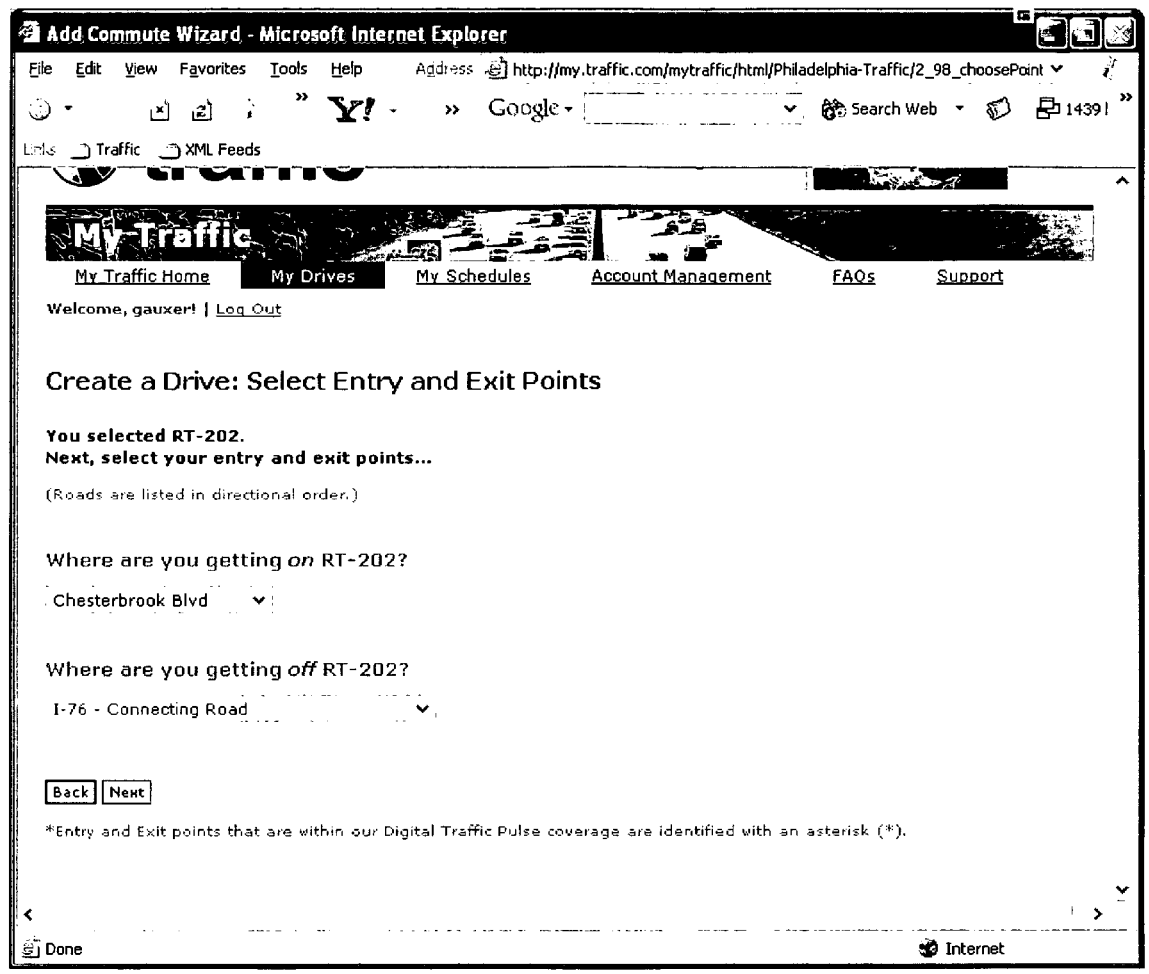
FIG. 3c shows the user interface display screen for selecting start and end points on starting road.

FIG. 3c shows the user interface display screen for selecting start and end points on starting road.

Figure 3D:
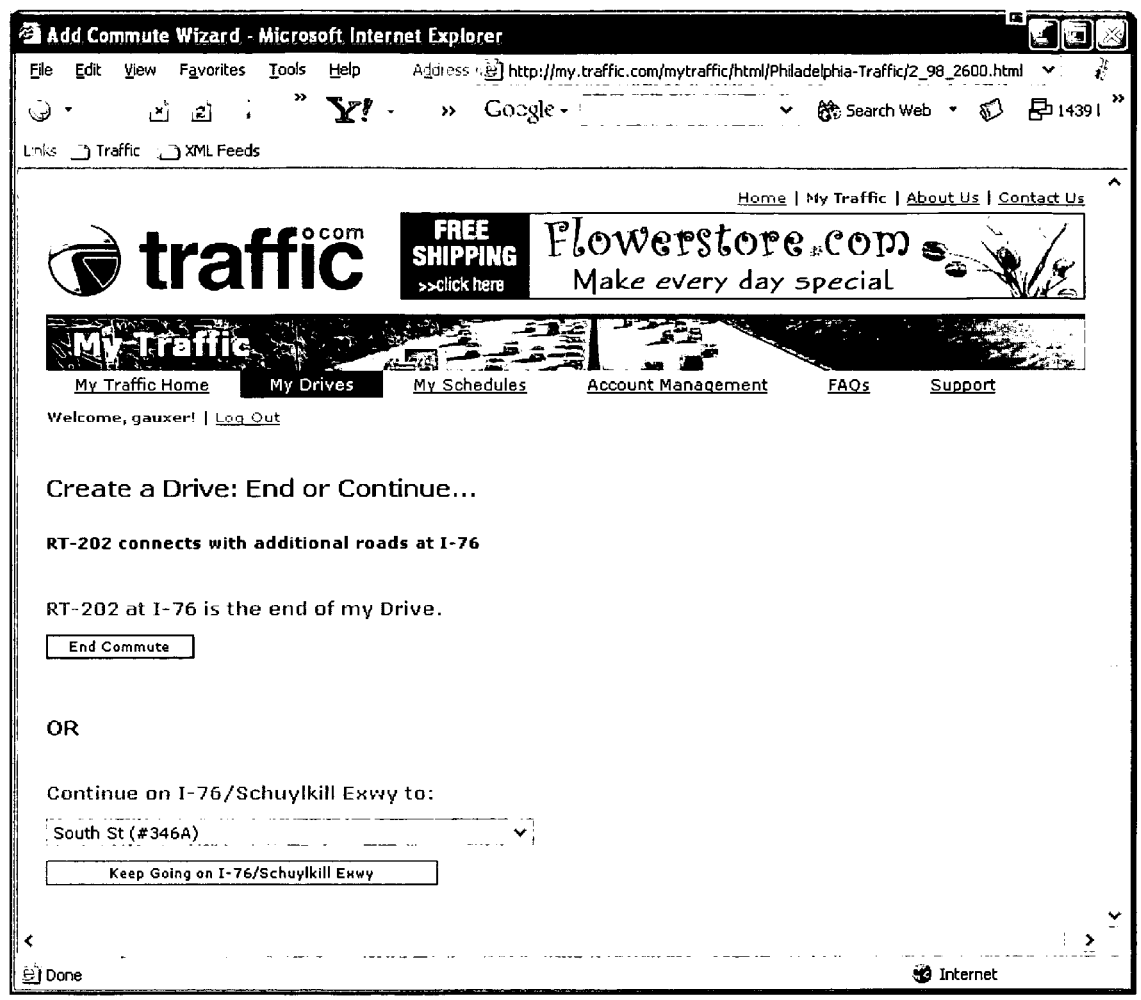
FIG. 3d shows the user interface display screen for selecting a continuation to a connecting roadway.

FIG. 3d shows the user interface display screen for selecting a continuation to a connecting roadway.

Figure 3E:
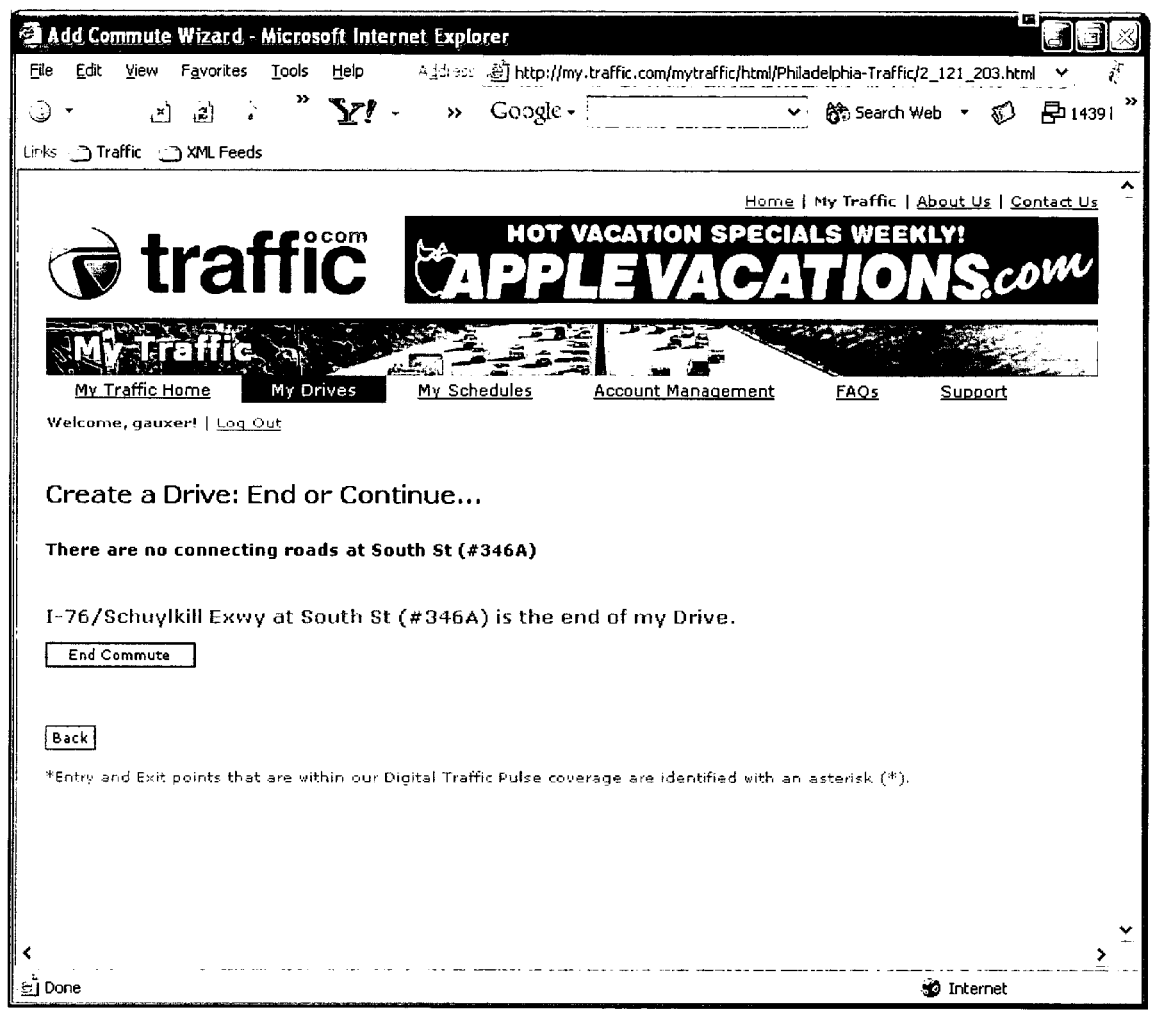
FIG. 3e shows the user interface display screen for selecting to end a commute.

FIG. 3e shows the user interface display screen for selecting to end a commute.

Figure 3F:
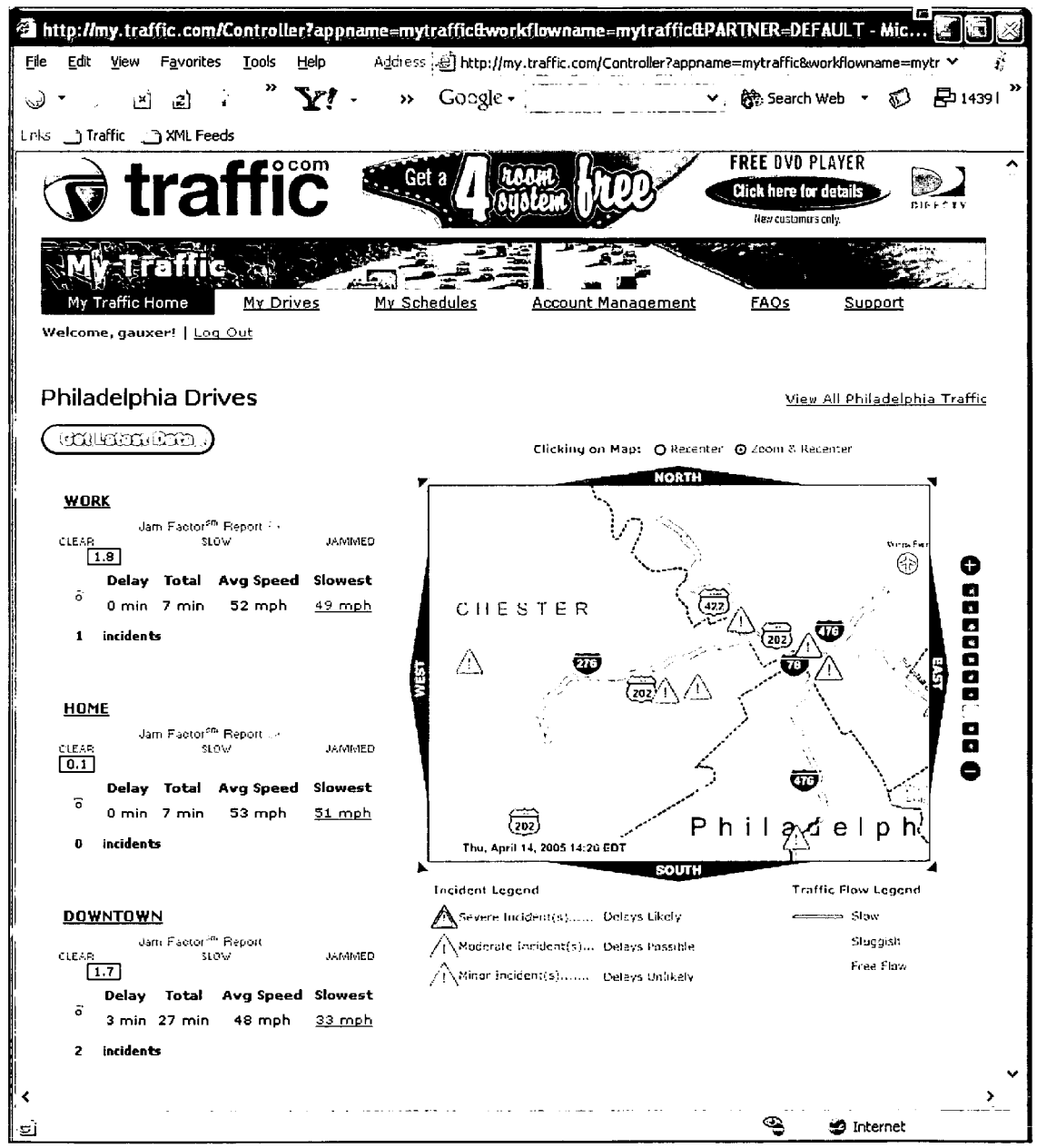
FIG. 3f shows the user interface display screen for viewing drives and overall Jam Factor for those drives.

FIG. 3f shows the user interface display screen for viewing drives and overall Jam Factor for those drives.

Figure 3G:
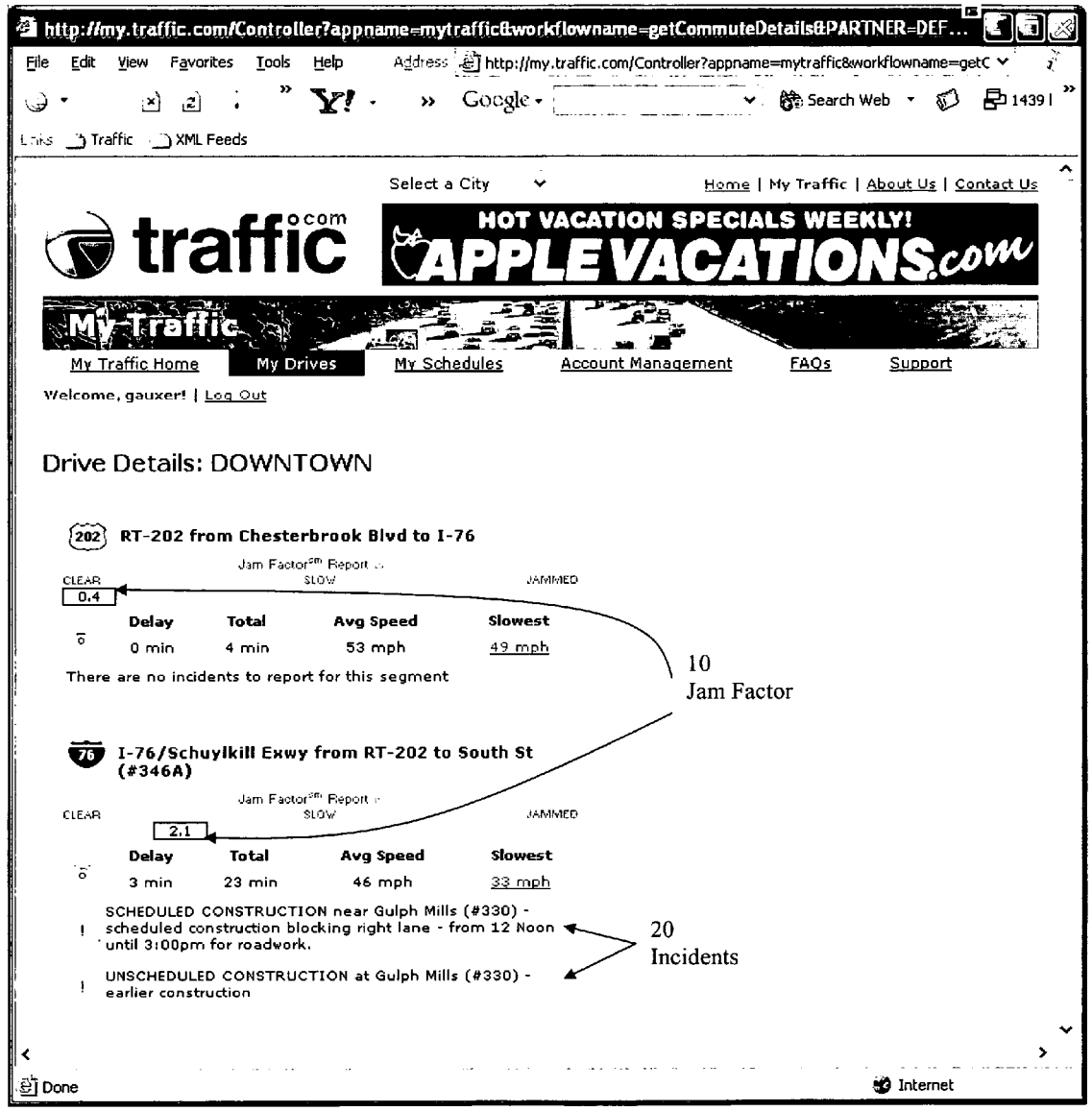
FIG. 3g shows the user interface display screen for viewing the Jam Factor (item 10) for the individual roadway sections along a specific previously created drive. Additionally, the display also shows incidents (item 20) on the individual roadway sections.

FIG. 3g shows the user interface display screen for viewing the Jam Factor (item 10) for the individual roadway sections along a specific previously created drive. Additionally, the display also shows incidents (item 20) on the individual roadway sections.

IV. Overview of a Traffic Magnet

A Traffic Magnet is a snippet of programming code that allows an end user to include live traffic information on their web site and provides a link from their site to a remote site containing the traffic information, such as Traffic.com. A remote site is defined as an entity other than the internet or intranet content provider.

Placing a Traffic Magnet on a web site allows the end user to provide live traffic information about the roads surrounding the end user's physical location to users of their web site who will travel to or from that physical location. Additionally, having such links embedded in many web sites provide benefits to the remote site (here, Traffic.com), such as driving internet traffic to the remote website, increasing brand awareness of the remote site, and improving search engine ranking of the remote site (when done using embedded HTML).

One preferred embodiment of a web-based Traffic Magnet product allows Traffic.com users to configure the magnet by selecting up to four roadways to track (in both directions), and one of several backgrounds. Configuration occurs through a web interface. Registration is preferably required for access to this interface. The output of the product is a snippet of HTML/Javascript that the user paste into their web page. Traffic information in the magnet will be provided on a Route basis. A single magnet will show several Routes but they must all belong to the same metropolitan area. Traffic.com may have the ability limit the number of magnets a user can create, but most likely there would not be a limit unless users abused the service. The terms and conditions may include a clause about users not abusing the service.

Backwards compatibility—magnets may have some static links which need to remain functional. Also, it is possible for the magnets to contain hardcoded route ID's. If they do, these keyroutes must not be deleted and the ID's must not be changed.

Tracking and Reporting site traffic—A user's magnets will be stored in the database. By attaching this magnet ID or user ID to all the inbound links, Traffic.com can track the traffic generated by specific users.

V. Specifications for a Traffic Magnet

The Traffic magnet project can be separated into two distinct components: (1) Traffic Magnet registration/maintenance, and (2) Traffic Magnet generation.

1. Traffic Magnet Registration/Maintenance

The user interface for creating traffic magnets is preferably web based, and located at http://magnet.traffic.com.

Figure 4A:
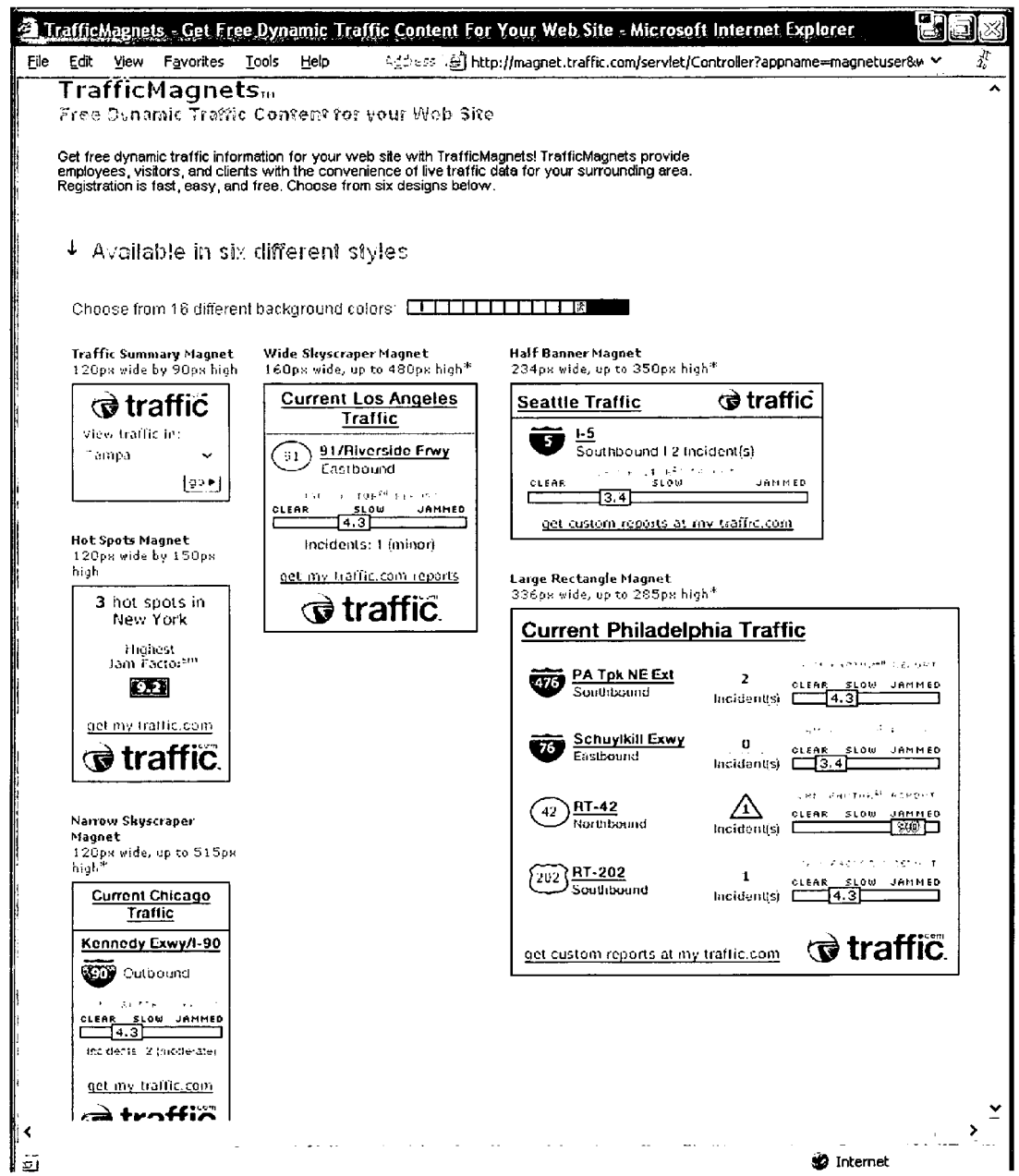
FIG. 4a shows the Magnet Product Page which a user will see when they first access the magnet website (or are not logged in).

FIG. 4a shows the Magnet Product Page which a user will see when they first access the magnet website (or are not logged in). This page will show examples of the various magnets that they can create for their website. From this page, a user can register for the service, or login if they have already registered.

a. Registration

Figure 4B:
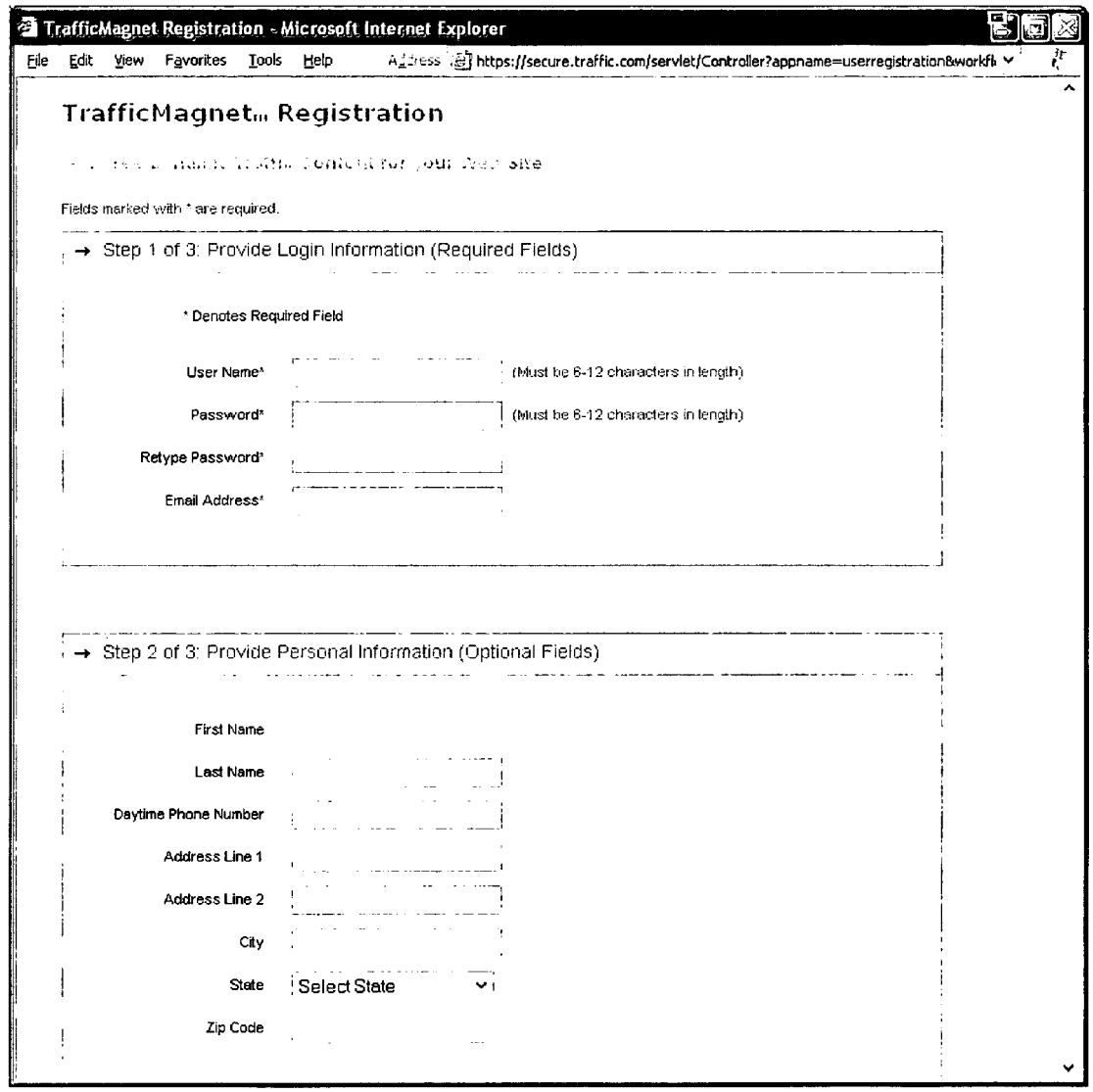
FIG. 4b shows a screenshot of the pages of the Traffic Magnet registration page where user information is entered.

FIGS. 4b and 4c show the registration page. The following data will be requested from the user:

TABLE 4

User Registration Information:

| First Name | Optional. |
|---|---|
| Last Name | Optional. |

TABLE 4-continued

User Registration Information:

| | |
|---|---|
| User Name | Required. 6-12 characters |
| Password | Required. 6-12 characters |
| E-mail Address | Required. |
| Company Name | Optional. |
| Phone Number | Optional. |
| Street Address 1 | Optional. |
| Street Address 2 | Optional. |
| City | Optional. |
| State | Optional. |
| Zip Code | Optional. |

Figure 7:
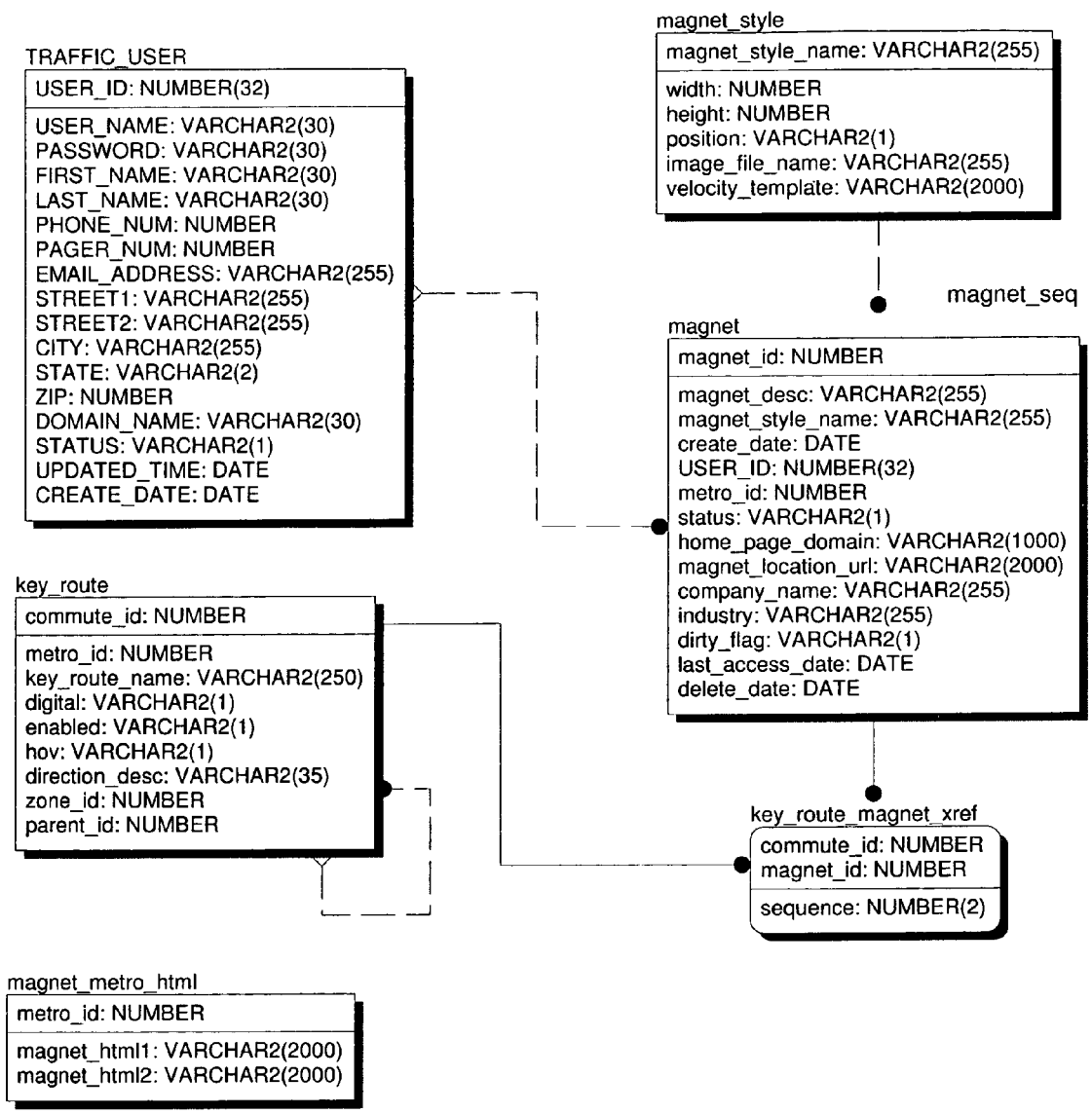
FIG. 7 shows the database schema for the Traffic Magnet data.

The user must enter in the required fields, and also agree to the terms and conditions for using the magnet service, in order to create an account. The data entered is saved in the traffic_user table in the database. The user creation date is also saved to verify when the user signed up and agreed to the terms and conditions. FIG. 7 shows the database schema.

After the user successfully creates an account, they can then log into the system with their newly created username and password.

b. Magnet Maintenance

Figure 4D:
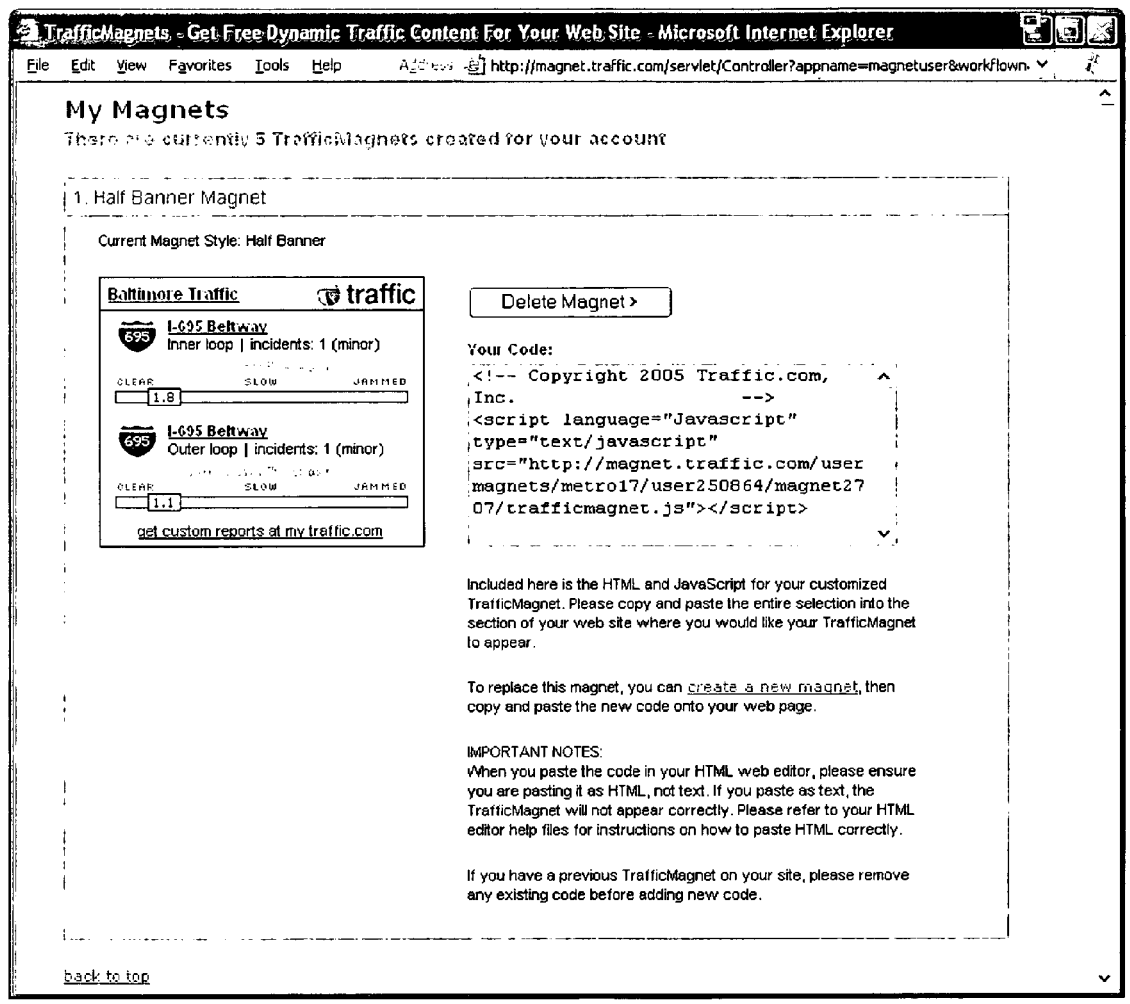
FIG. 4d shows an example of a magnet on the maintenance page.

FIG. 4d shows an example of a magnet on the maintenance page. After a user is logged in, they will be forwarded to the magnet maintenance page where they will see a list of their previously created magnets. The actual magnets will be displayed, along with a text block containing the magnet code snippet and a button to delete the magnet. Users will not be able to edit a magnet. If they want to change a magnet style, or the keyroutes associated with a magnet, they will need to delete it and create a new one.

c. Magnet Creation

After logging in, a user will also be able to create a new magnet. The style of the magnet will determine the magnet size. Each magnet style has a standard size (e.g., 410×285 horizontal, 200×605 vertical).

Information on magnet styles will be contained in the database (Refer to FIG. 7 for the database schema). The styles will define the layout, background, orientation and color scheme of the magnet. A user will select from one of these styles when creating their magnet. The following fields will be needed to define a magnet style.

TABLE 5

Fields Defining Magnet Style
Magnet

| | |
|---|---|
| Magnet Style Name | Name of Magnet |
| Position | H (Horizontal) or V (Vertical) |
| Image | Example Image File Name |
| Width | Width of the magnet |
| Height | Height of the magnet |
| Velocity Template | Template defining the html style and format for this magnet |

Magnets will also contain links to the website, promotions, advertisements, etc. This information can be different between metropolitan areas and may be updated at random times. It will be separated into two sections on the magnets. Each section will have its own html. The users have no control over this information. The following data needs to be stored in the database to create these html blocks.

TABLE 6

Data for Creation of HTML Blocks
Magnet HTML

| | |
|---|---|
| MetroId | Metro Id of magnets that link will show up on |
| Magnet HTML 1 | HTML to be displayed in the first section |
| Magnet HTML 2 | HTML to be displayed in the second section |

The user will be shown examples of magnets during creation in order to select the style they want for their website. (Note: terms of service must outline proper use of magnet. e.g. magnet can only exist at domain on one (1) page, etc.)

Figure 4E:
FIG. 4e shows a screenshot of the magnet creation page where user information is entered.
Figure 4F:
FIG. 4f shows a screenshot of the magnet creation page where the format of the magnet is selected.

FIGS. 4e and 4f show screenshots of the magnet creation page. The following information needs to be captured for each magnet that the user creates. This data not only defines the user's magnet, but also gives us more information to be used to better track how the magnet is being used. The user will be allowed to select up to four roads for a magnet (which will equate to eight routes, when direction is taken into account). Although a user may create magnets for different metropolitan areas, an individual magnet will only be applicable to a single metropolitan area.

TABLE 7

Information captured for each magnet a user creates
User Magnet

| | |
|---|---|
| Company Name | Optional. |
| Industry | Optional. |
| Home Page Address | Required. |
| Traffic Page Address | Required. |
| Magnet Description | Required. |
| Magnet Style Name | Required. |
| Metro Id | Required. |
| Route Id 1 | Required |
| Route Id 2 | Optional |
| Route Id 3 | Optional |
| Route Id 4 | Optional |

After a user creates their magnet, they will be directed back to the magnet maintenance page where they can see their new magnet. They will also have access to the code snippet to include the magnet on their website.

d. Traffic Magnet Creation Use Cases

TABLE 8

Steps - User registers for a magnet account
UC01 Use Case 1
User registers for a magnet account

| Step | User Action | Result | FIG. | Alternate |
|---|---|---|---|---|
| 1 | User goes to magnet.traffic.com | User sees Magnet Product Page | FIG. 2a | N/A |
| 2 | User Clicks on "Sign Up Now" button | Go to registration page | FIG. 2b & 2c | |
| 3 | User Enters Values defined in 0 and submits form | User is now registered | | standard error |

TABLE 9

Steps - User logs into magnet account
UC02 Use Case 2
User logs into magnet account
Assumes user has registered and verified email address

| Step | User Action | Result | FIG. | Alternate |
|------|-------------|--------|------|-----------|
| 1 | User clicks on "Login" link | Go to login page | | N/A |
| 2 | User enters name and password and clicks submit | Go to magnet maintenance page | | Standard error |

TABLE 10

Steps - Registered User Creates a Traffic Magnet
UC03 Use Case 3
Registered User Creates a Traffic Magnet
Assumes user has registered and logged in explicitly during this session.

| Step | User Action | Result | FIG. | Alternate |
|------|-------------|--------|------|-----------|
| 1 | Chooses to create magnet | Go to magnet set up page | FIG. 2e & 2f | N/A |
| 2 | Enter Company, Site information | N/A | | standard error |
| | This information is required. Alternate processing is standard error handling for these elements. | | | |
| 3 | Enter Magnet Values | N/A | | standard error |
| | User selects metro area, which populates keyroute list. User can select up to 4 keyroutes (Javascript validation), and one background image. | | | |
| 4 | Confirm Legal Agreement | N/A | | standard error |
| | User is required to check on "Agree" radio button. | | | |
| 5 | User selects 'continue' | Go to Magnet Maintenance | FIG. 2d | |
| | Magnet maintenance page gives user some indication about how to use html snippet and provides code in a scrolling text pane. User has to copy HTML in order to paste into their page. | | | |

VI. Traffic Magnet Generation

Traffic magnets are displayed through a code snippet that a user places on their website. The code snippet will contain links to javascript files located on the traffic.com servers, as well as some static html. The javascript files will be auto generated on a regular basis so that a user is accessing a static file. The traffic magnets will contain links back to specific areas on the www.traffic.com website. All links and images in the magnet will have a referral id to track statistics on magnets. HTML provided will be standards compliant and valid, with all styling accomplished through the use of inline CSS.

a. Example Magnets

Figure 5:
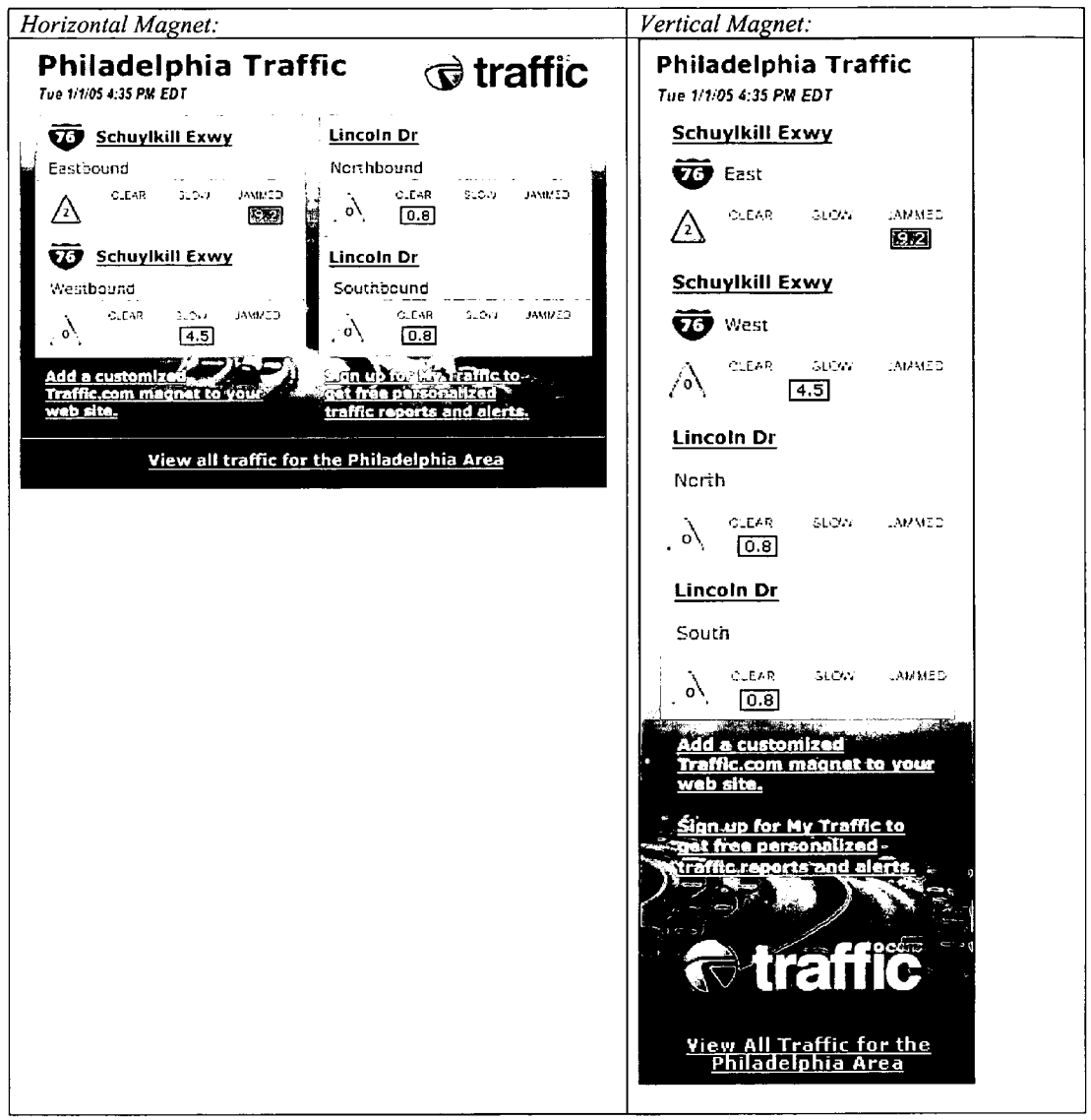
FIG. 5 shows examples of the layouts of a horizontal magnet and a vertical magnet.

FIG. 5 shows examples of the layouts of a horizontal magnet and a vertical magnet.

b. Magnet Content

A Magnet will be applicable to a single metropolitan area and will contain information on one to four routes. Each route section of the magnet may contain any or all of the following information:

Roadway Name and Direction

Roadway Shield (if applicable to the road)—Four different shield types (U.S. state, interstate, county) with the road number overlaid on top.

Incident Icon—Triangle with the number of incidents along route inside. The triangle border will be colored red if there are any high criticality incidents, and yellow if there are any medium criticality incidents.

Jam Factor—Visual representation of route conditions, equating to a number between 0 and 10.

The magnet will also contain the following information: Metro Name, Timestamp of route data, and two sections for metropolitan specific advertisements and links.

c. One Preferred Embodiment for Generating Magnets

The process for generating magnets needs to be a compromise between flexibility, security and scalability. One preferred solution is to use Javascript as the main piece of the code snippet that the user pastes on their webpage. This is not as scalable as using straight HTML code, but gives much more flexibility to change the content of the magnet without affecting the user's website. It also makes it more difficult for the user to try and modify the look of the magnet (which should be a violation of the Terms and Conditions). The downside to this solution is that it will not improve the search engine ranking. To try and overcome the search engine ranking problem, some static html must be included in the magnet code snippet which refers back to the traffic.com website.

The javascript will be contained in files on traffic.com servers, and the user's code snippet will simply point to the proper files for the respective magnet. The javascript will be generated in two parts. One part will generate the user's magnet code in a file named magnet.js. The other part will generate the code for each route section of the magnet in files named keyroutedetails.js. A single magnet code snippet will then point to one magnet.js file (which will include references to the applicable keyroutedetails.js files).

Since the user cannot directly manipulate the Javascript code, Traffic.com can enforce that each link on the magnet will contain information identifying the magnet user. This will allow Traffic.com to easily track the traffic coming from each user/magnet through the Apache web logs.

i. Route Information Generation

Route information will be pre-generated every two minutes for each known route in the metro area. The process will create a javascript file (keyroutedetails.js) and an incident icon (incident.gif) for every route. This information will be shared by all magnets which contain the same route. The keyroutedetails.js file will contain methods for retrieving the timestamp and jam factor for a route. The incident icon will be an image file determined through the incidents along the route. The two generated files will be placed on the magnet.traffic.com server in a location similar to keyroutes/metro<metroid>/keyroute<routeid>_<route-direction>. The text in between "<>" is text that is replaced by real data during processing.

The incident icon is chosen from an incident image repository based upon the current incidents along the route. The image repository will contain all of the possible variations of incident icons (icons with yellow, red and clear borders as well as numbers from 0-9 inside). The proper image is selected by counting the number of incidents along the route (which determines the number) and finding the highest criticality incident (which determines the border, red for high criticality and yellow for medium criticality). The image file is renamed to incident.gif when moved to the route directory defined above.

The javascript file will contain a method for getting the timestamp of the data (getTime) and two methods to create the jam factor image (getVertJamFactor<routeid> for vertical magnets and getHorizJamFactor<routeid> for horizontal magnets). The jam factor image is created by using a static image for the multi-colored background bar and having 11 different rectangular slider bar locations for each integer from 0-10. The left most location will be 0, and the right most 10. The jam factor value will be truncated to one decimal place and shown on the rectangular slider. The slider location is determined by the whole number value of the jam factor. The slider color also changes with different locations.

ii. Magnet Information Generation

The magnet Javascript file will be pre-generated on an as-needed basis. All active magnets will be created when the magnet generation process starts. After the initial creation pass, the process will check for all magnets labeled as "dirty" to recreate. A magnet may be labeled as dirty when:
- Magnet is created
- Magnet is deleted
- Route changes are made to the system, affecting specific route ID's
- Design for a style changes
- Magnet html for a metro changes.

Magnet information consists of the magnet.js file and symbolic links pointing to the route directory (created by the process noted above) for each route in the magnet. This information is placed in a location similar to magnets/metro<metroid>/<userid>/<magnetid>js. The symbolic links hide the actual location of the keyroute information so users cannot easily find and use content outside of their magnet definition. When a magnet is deleted, the symbolic links are broken and a "deleted" version of the magnet.js file is created. In this manner, the user no longer has access to any of the information.

Figure 6:
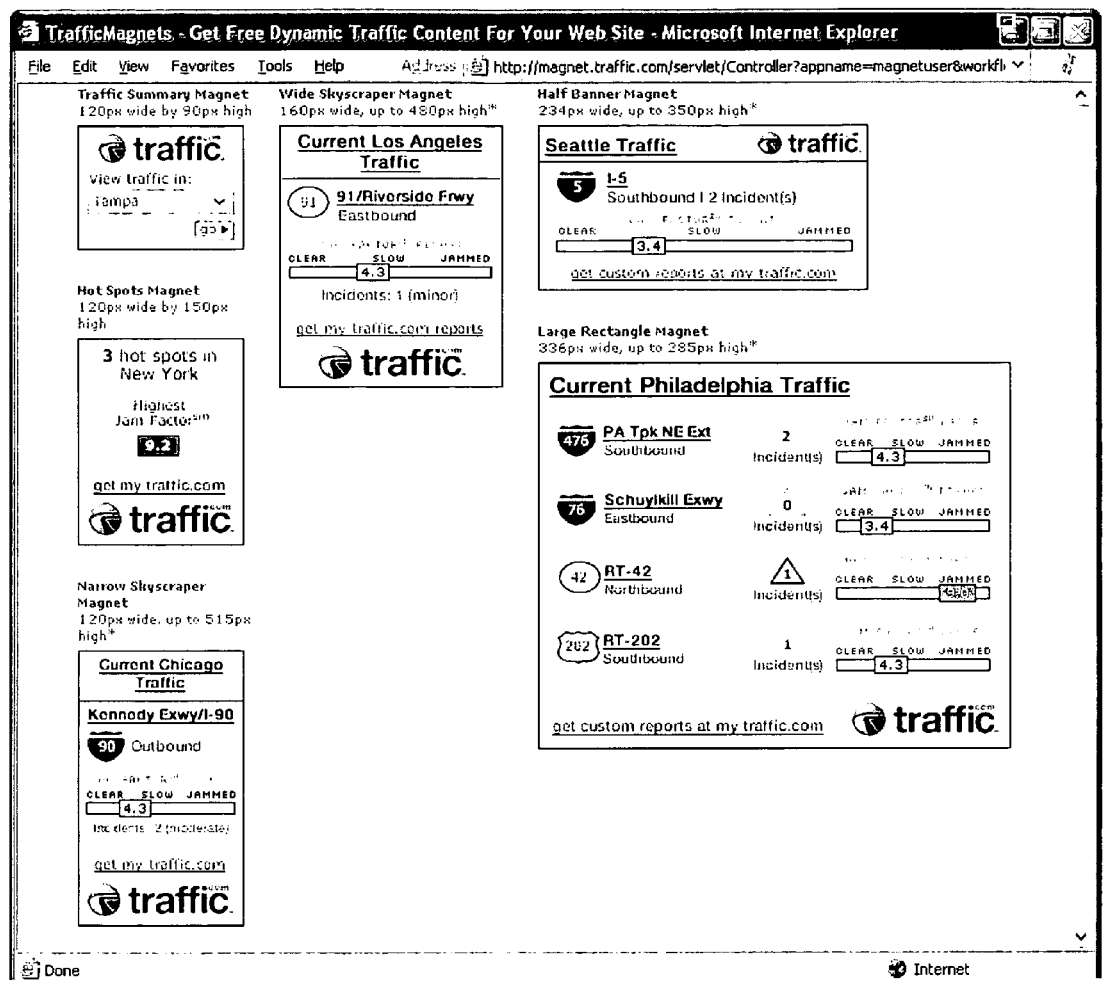
FIG. 6 shows some of the different styles of magnets available to the user.

FIG. 6 shows some of the different styles of magnets available to the user. Magnet style templates are saved in the database and used to generate the magnet.js file. There are multiple styles that the user can choose from for displaying the selected route content. The user chooses a style for each magnet. The user also selects the routes which will appear on the magnet. When a magnet is generated, the style template is pulled from the database and the selected routes are used to create the route sections. The route name, direction, ID, shield type and roadway number are all needed by the template.

The real-time parts of the magnet are the timestamp, the jam factor for each route, and the incident icon for each route. The content of the magnet javascript file changes very infrequently, but will still contain real-time data by calling methods on the above-generated keyroutedetails.js files. The jam factor method called will be determined by the magnet orientation (horizontal/vertical) and route ID's. For example, the method getHorizJamFactor456( ) will be used for route 456 in a horizontal magnet. The time is retrieved by calling getTime( ) which exists in each keyroutedetails.js file and should have the same time for all routes in a metro. The incident icon (incident.gif) for each route, which changes with the keyroutedetails.js file, is included in the magnet through the symbolic link paths.

d. Alternative Embodiment for Generating Magnets

In another embodiment of the present invention, only traffic conditions are requested from the remote site. In this embodiment, the user retrieves all of the code in the snippet needed to assemble the magnet, and the dynamic pieces of the magnet (traffic data), via XML. Instead of the code snippet being a link to a javascript file, it is a snippet of html and javascript which creates the entire magnet, minus the real time traffic data. The traffic data (and only the traffic data) can then be downloaded on a regular basis from the Traffic.com web site to fill in on the magnet. The XML can be generated as a separate file for each metropolitan area containing the real-time data for the metropolitan area keyroutes.

VII. Data Flow Diagram for the User Interface

Figure 8:
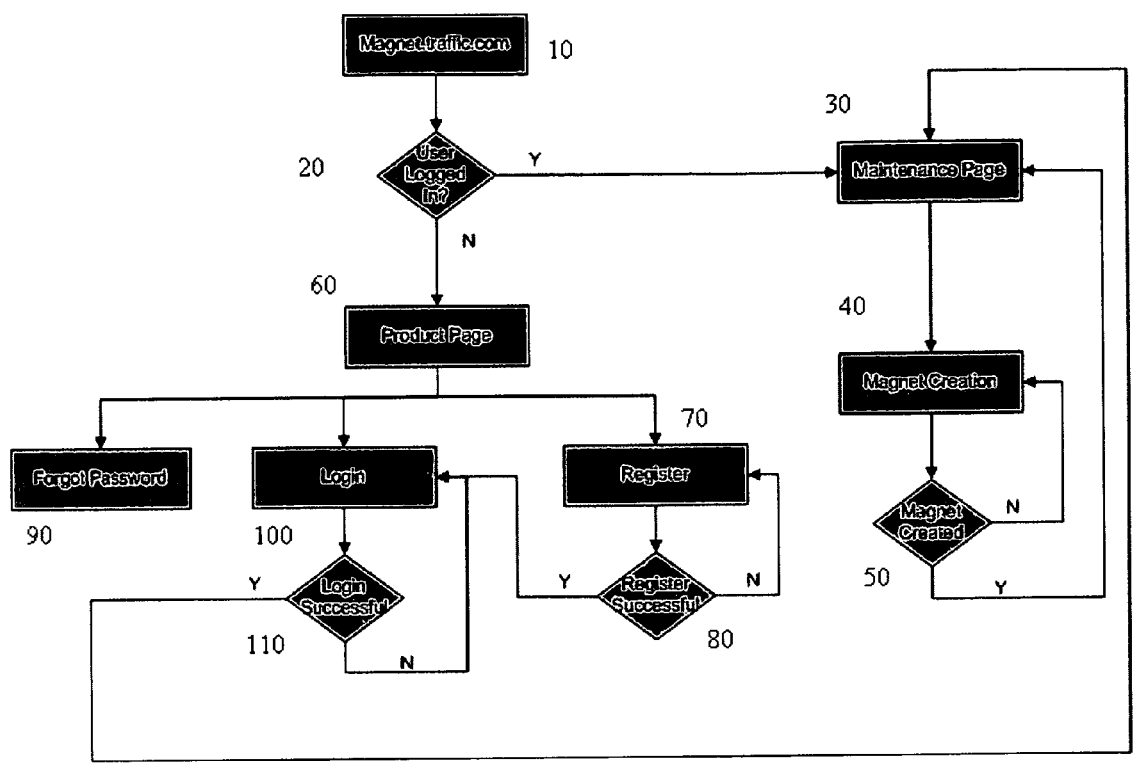
FIG. 8 shows a Data Flow Diagram for the user interface for the creation of a Traffic Magnet.

FIG. 8 shows a Data Flow Diagram for the user interface. The steps in the diagram are explained as follows:

10. User specifically types in or is directed to the magnet.traffic.com domain

20. The application checks if there are any browser cookies available which specify that the user has already logged in.

30. If the login cookie exists, the user information is pulled from the cookie and the user is directed to the magnet maintenance page (See section V.1.b).

40. User selects to create a new magnet and is directed to the magnet creation page to select the details of the new magnet (See section V.1.c).

50. If magnet is successfully created, the user is redirected back to the magnet maintenance page to see their new magnet and the code snippet necessary to place on their website (the actual magnet may take a few minutes before it can be seen on the page, but the code snippet is available immediately).

If the magnet could not be created, the user is directed back to the magnet creation page (with all their selected values pre-filled) and a message specifying which form field needs to be addressed to fix the problem.

60. If the user is not logged in when going to magnet.traffic.com, they will be directed to the magnet home page (See section V.1).

70. If a user selects to register from the magnet home page, they are directed to the registration sign up form (See section V.1.a).

80. If there was an error during registration, the user is redirected back to the registration page (with all their selected values pre-filled) and a message specifying which form field needs to be addressed to fix the problem.

If registration was successful, the user is redirected to the login screen to use their newly created username and password for entry into the magnet website.

90. If a user has forgotten their password, they can enter their username on this form and receive an email containing their password.

100. The user can login from the home page by entering their username and password into the proper fields.

110. If the login is successful, the user will be redirected to the magnet maintenance page. If the login is not successful, they will be redirected back to the login page and notified that their username/password combination was incorrect.

VIII. Reporting Internet Traffic from Traffic Magnets

The necessary data for reporting internet traffic from traffic magnets is collected and saved. Accordingly, statistics can be generated at any time. There are two different sets of data being collected. One set is the information collected when the user is maintaining their magnets and is saved in the database. The other set of data is the web traffic information related to the magnets and is collected through Apache server web logs. All URLs in the magnets contain a reference to the current magnet, which not only allows Traffic.com to determine the number of times the magnet is loaded, but also which magnets are driving traffic back to the main website. All Apache web logs are saved off to a separate server on a daily basis. These logs can be parsed by a Perl script or Java process to retrieve necessary information. Tables 11-13 outline the requested reporting areas.

TABLE 11

Aggregate Data

Aggregate Data: Grand Totals
    Total # of Accounts [db]
    # of Active Accounts (accessed in prior month)
    # of New Accounts (in prior month) [db]
    # of Deleted Accounts [db]
    Total # of Magnets [db]
    # of Active Magnets
    # of New Magnets [db]
    # of Deleted Magnets [db]
    # of Unique Users across all Accounts/Magnets
    # of Accesses/Pageviews across all Accounts/Magnets
    # of Clickthroughs to www.traffic.com
Aggregate Data: Metro Totals - same as Grand
Totals but broken down by Metro

TABLE 12

Detailed Data for each Account/Magnet

Detailed Data for each Account/Magnet:
    All Account and Magnet configuration info
    (Company, url, metro, Keyroute list, etc. [db]
    # of Unique Users per Magnet
    # of Accesses/Pageviews per Magnet
    # of Clickthroughs to www.traffic.com

TABLE 13

Data for magnet.traffic.com web site

Data for magnet.traffic.com web site
    # of UVs per Page (home page, signup, magnet setup, etc.)
    # of Pageviews per Page
    Ideally: Clickstream data to give visibility into where
    users go on the site (% who follow each link on
    each page vs. leave the site)

Some of this information will be determined through the database. The rest will need to parsed from the Apache web logs. After parsing the Apache web logs, the result data can either be stored in the database or emailed to a specific list of addresses.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of allowing a web page creator to create a web page that displays traffic information on a web page, the traffic information including traffic conditions of one or more specified roads, the method comprising:

(a) a web page creator selecting via a user interface one or more roads for which the traffic information is to be displayed;

(b) generating programming code based on the selections, wherein the programming code includes an identifier of a file that includes the one or more selected roads, and wherein the programming code further includes a remote site from which at least a portion of the traffic information is to be retrieved from; and (c) the web page creator inserting the programming code into a web page, wherein the programming code, when executed by a web browser, causes a display on a web page of traffic information for the selected roads.

2. The method of claim 1 wherein the programming code further includes:

(i) a uniform resource identifier (URI) of the remote site, and (ii) a unique identifier of the traffic information.

3. The method of claim 1 herein the traffic information includes real-time traffic conditions of one or more specified roads.

4. The method of claim 1 wherein the one or more roads for which the traffic information is to be displayed defines a specified driving route, and the traffic conditions is a rating that represents the status along the specified driving route.

5. The method of claim 1 wherein the web page includes content other than traffic information, the traffic information being displayed on only a portion of the web page.

6. The method of claim 1 wherein the displayed traffic information includes:

(i) information identifying the one or more specified roads, and (ii) traffic flow data on the specified one or more roads.

7. The method of claim 1 wherein the displayed traffic information further includes information about the metropolitan area where the one or more specified roads are located.

8. The method of claim 1 wherein the displayed traffic information further includes a timestamp of the traffic conditions on one or more specified roads.

9. The method of claim 1 wherein the displayed traffic information further includes information describing characteristics of the one or more specified roads.

10. The method of claim 1 wherein the displayed traffic information further includes a roadway name and/or route shield.

11. The method of claim 1 wherein the displayed traffic information further includes the number of incidents on the one or more specified roads.

12. The method of claim 1 wherein the displayed traffic information further includes links to a website, a promotion or an advertisement.

13. The method of claim 1 wherein the programming code includes static HTML that identifies a traffic-related domain name.

14. The method of claim 1 wherein step (a) further comprises the web page creator further selecting via the user interface a visual format in which to present the display of the traffic information, and step (c) further comprises the display appearing in the selected visual format.

15. The method of claim 1 wherein the inserting step (c) occurs by a copy and paste operation, the generated programming code being copied and pasted into source code of the web page.

16. A computer-implemented method for creating a plurality of different traffic-related files, each file including programming code used to create a display on a web page of traffic information for one or more specified roads, the traffic information including traffic conditions of the one or more specified roads, the method comprising:
(a) providing a web site for use by web page creators to create different traffic-related files; and
(b) using the web site to create each of the plurality of different traffic-related files by:
(i) specifying one or more roads for which the traffic information is to be displayed for each of the different files; and
(ii) generating programming code based on the one or more roads specified for each of the different files, wherein the programming code includes an identifier of a file that includes the one or more specified roads, and wherein the programming code further includes a remote site from which at least a portion of the traffic information is to be retrieved from, and the programming code, when executed by a web browser, causes a display on a web page of traffic information for the one or more specified roads, wherein the web site provided in step (a) is not used by, and is unrelated to, any web sites that are created by the web page creators to display web pages with traffic information.

17. The method of claim 16 further comprising:
(c) simultaneously storing each of the plurality of different created traffic-related files, with its respectively generated programming code, the programming code of the stored files being usable at the time of creation and at times subsequent to creation for insertion into a web page.

18. The method of claim 16 wherein steps (a) and (b) are performed by a web server.

19. The method of claim 16 wherein the programming code further includes:
(i) a uniform resource identifier (URI) of the remote site, and
(ii) a unique identifier of the traffic information.

20. The method of claim 16 wherein the traffic information includes real-time traffic conditions of the one or more specified roads.

21. The method of claim 16 wherein the one or more roads for which the traffic information is to be displayed defines a specified driving route, and the traffic conditions is a rating that represents the status along the specified driving route.

22. The method of claim 16 wherein the programming code includes static HTML that identifies a traffic-related domain name.

23. The method of claim 16 wherein the displayed traffic information includes:
(i) information identifying the one or more specified roads, and
(ii) traffic flow data on the specified one or more roads.

24. The method of claim 16 wherein step (b)(i) further comprises specifying a visual format in which to present the display of the traffic information, and wherein the display in step (b)(ii) occurs in the specified visual format.

25. A computer-implemented method for providing snippets of programming code that allow end users to include live traffic information on their own web sites and that provide a link from their sites to a remote site containing the traffic information, the method comprising:
(a) providing a web site at which end users specify at least one road; and
(b) providing a snippet of programming code from the web site to each of said end users, wherein the snippet includes an identifier of a file that includes the at least one specified road, and wherein the snippet specifies where the traffic information is to be retrieved from, and further wherein the snippet is to be inserted on a web page of the end user's web site and thereafter, when run by a web browser accessing the web page on the end user's web page, causes the display of traffic information about the at least one road.

26. The method of claim 25 wherein the snippet causes the traffic information to be displayed in a box drawn on the end user's web page.

27. The method of claim 26 wherein the box occupies a relatively small portion of space on the end user's web page.

28. The method of claim 25 wherein step (a) further comprises providing the end users a plurality of different roads for which to obtain traffic information.

29. The method of claim 25 wherein step (a) further comprises providing end users different layout styles for display of traffic information on their web sites.

30. The method of claim 25 wherein the snippet causes advertising to be displayed along with the traffic information on the end user's web page.

31. The method of claim 25 further comprising:
(c) inserting the snippet of programming code into source code of the end user's web page by a copy and paste operation.

* * * * *